(No Model.)
E. H. ISRAEL.
TRAP FOR SINKS, BATH TUBS, &c.
No. 549,364. Patented Nov. 5, 1895.
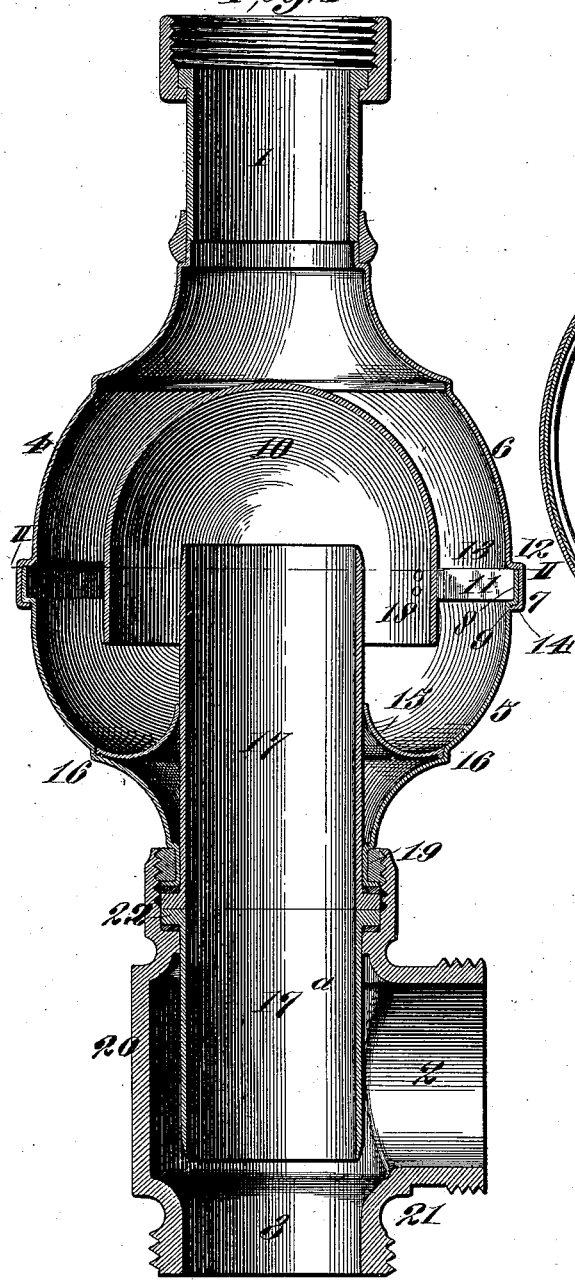
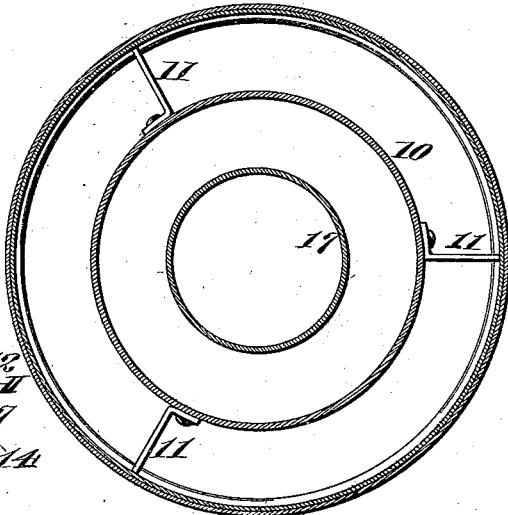
Attest:
E. S. Knight
Stanley Stoner
Inventor:
Earl H. Israel
By Knight Bro
Atty's.

UNITED STATES PATENT OFFICE.

EARL H. ISRAEL, OF ST. LOUIS, MISSOURI, ASSIGNOR TO THE L. M. RUMSEY MANUFACTURING COMPANY, OF SAME PLACE.

TRAP FOR SINKS, BATH-TUBS, &c.

SPECIFICATION forming part of Letters Patent No. 549,364, dated November 5, 1895.

Application filed July 2, 1895. Serial No. 554,759. (No model.)

*To all whom it may concern:*

Be it known that I, EARL H. ISRAEL, of the city of St. Louis, in the State of Missouri, have invented a certain new and useful Improvement in Traps for Sinks, Bath-Tubs, and the Like, of which the following is a full, clear, and exact description, reference being had to the accompanying drawings, forming part of this specification.

My invention relates to an improved construction of trap for bath-tubs, sinks, and other like articles; and the object of my invention is to construct a trap which will be effective in its operation, not liable to clog, and which will be comparatively inexpensive.

My invention consists in features of novelty hereinafter fully described, and pointed out in the claims.

Figure I is a vertical section of my improved trap. Fig. II is a transverse section taken on line II II, Fig. I.

Referring to the drawings, 1 represents the neck of the trap, with which the pipe leading to the sink, tub, or other article connects.

2 represents the vent-pipe connection, and 3 the discharge-pipe connection.

The body 4 of the trap is designed to be made of spun metal, and is composed of a lower half or member 5 and an upper half or member 6, the two members being united by a joint 7. The joint is made by spinning a flange 8 on the part 5 of the trap, thus forming a shoulder 9, upon which is supported a dome-shaped cup 10 in inverted position, the dome having radially-extending arms or projections 11, that extend to and rest upon the shoulder 9. The member 6 of the trap has a flange 12 spun thereon, forming a shoulder 13, which when the parts are put together fits down upon the arms or projections 11 of the cup 10, and the cup is thus held firmly between the shoulders 9 and 13.

When the parts 5 and 6 are placed together, they are held by turning the lower edge 14 of the flange 12 inwardly beneath the shoulder 9, as shown in Fig. I. Before the parts 5 and 6 are put together I place within the part 5 a concave collar 15, the outer edge of which rests upon the lower end of the part 5 of the trap at 16 and the upper edge of which fits snugly around a central tube 17, that extends up into the cup 10. The collar 15 forms with the inner wall of the part 5 of the trap a rounded surface, and the collar directs the matter passing through the trap upwardly through the space 18 between the lower open end of the cup and the upper end of the tube 17. By the use of the collar 15 sharp angles in the course of the matter passing through the trap are avoided.

As stated, the upper end of the surface of the tube 17 extends up into the cup 10, and thus a seal is formed, as water will stand in the body of the trap to a point on a level with the top of the tube 17.

The lower end of the part 5 of the trap is spun around a threaded ring 19, which in connecting up the trap is screwed into the union or coupling 20, with which the vent and discharge pipes connect.

The tube 17 has a lower extension $17^a$, projecting into the coupling 20, and which causes the matter passing through the trap to be deposited in the coupling at a point beneath the main portion of the opening 2 of the vent-pipe. The interior of the coupling is larger than the diameter of the part $17^a$ of the tube, and there is a space 21 between the lower end of the part $17^a$ of the tube and the coupling to permit the gases to pass from the discharge-pipe through the vent-pipe.

The two parts of the tube have their adjacent ends flanged, as shown at 22, these parts extending into the upper threaded neck of the coupling, and the two parts of the tube thus being held together by the coupling.

By locating the vent-pipe beneath the seal of the trap instead of above the seal, as has heretofore been customary, the trap may be connected to the tub or sink close up to the latter, avoiding a long connecting-pipe for collecting and retaining foul matter and air, and another advantage is that when a pump is applied to clear the trap the full force of the pump is exerted on the matter in the trap and no part of the force is lost by escaping through the vent-pipe, as is the case where the vent-pipe is above the seal of the bowl.

It is evident that the collar 15 might be formed integral with the lower half 5 of the body of the trap, when the part from the point 16 to the ring 19 would be a separate piece fitted to the part 15. It is also evident that the ring 19, with the parts above it, might be screwed into a plain discharge-pipe instead of into a coupling 20.

By making the body of the trap of spun metal it is much smoother, cheaper, and lighter than when cast or made in the ordinary way.

I claim as my invention—

1. In a trap, the combination of an inverted cup located within the body of the trap, a tube extending into said cup, and a concave collar extending from the wall of the body of the trap to said tube, substantially as and for the purpose set forth.

2. In a trap, the combination of a dome-shaped cup located in an inverted position within the body of the trap, arms or projections secured to the cup and resting between shoulders formed upon the upper and lower members of the body of the trap, a tube extending upwardly from the lower part of the trap and into the lower end of said cup, and a concave collar extending from the wall of the body of the trap to said tube substantially as and for the purpose set forth.

3. In a trap, the combination of the body portion, having flanges 8 and 12 forming shoulders 9 and 13, a cup located within the body of the trap in an inverted position, arms secured to the cup and resting between said shoulders 9 and 13, a tube extending into the open end of said cup, a concave collar extending from the lower part of the body of the trap to said tube, and a coupling beneath the body of the trap having a waste pipe and a vent pipe connection; said tube having a lower extension projecting into said coupling; substantially as and for the purpose set forth.

4. In a trap, the combination of a body portion, an inverted cup located in the body portion, a tube extending into the cup, and a coupling to which the body portion is united; the lower end of said tube extending into said coupling and the interior of the coupling having a larger diameter than the diameter of the tube extending into the coupling; substantially as and for the purpose set forth.

EARL H. ISRAEL.

In presence of—
GEO. H. KNIGHT,
E. S. KNIGHT.